G. R. BROWN.
BALING PRESS.
APPLICATION FILED FEB. 12, 1914.

1,215,613.

Patented Feb. 13, 1917.
3 SHEETS—SHEET 1.

Witnesses.

Inventor George R. Brown

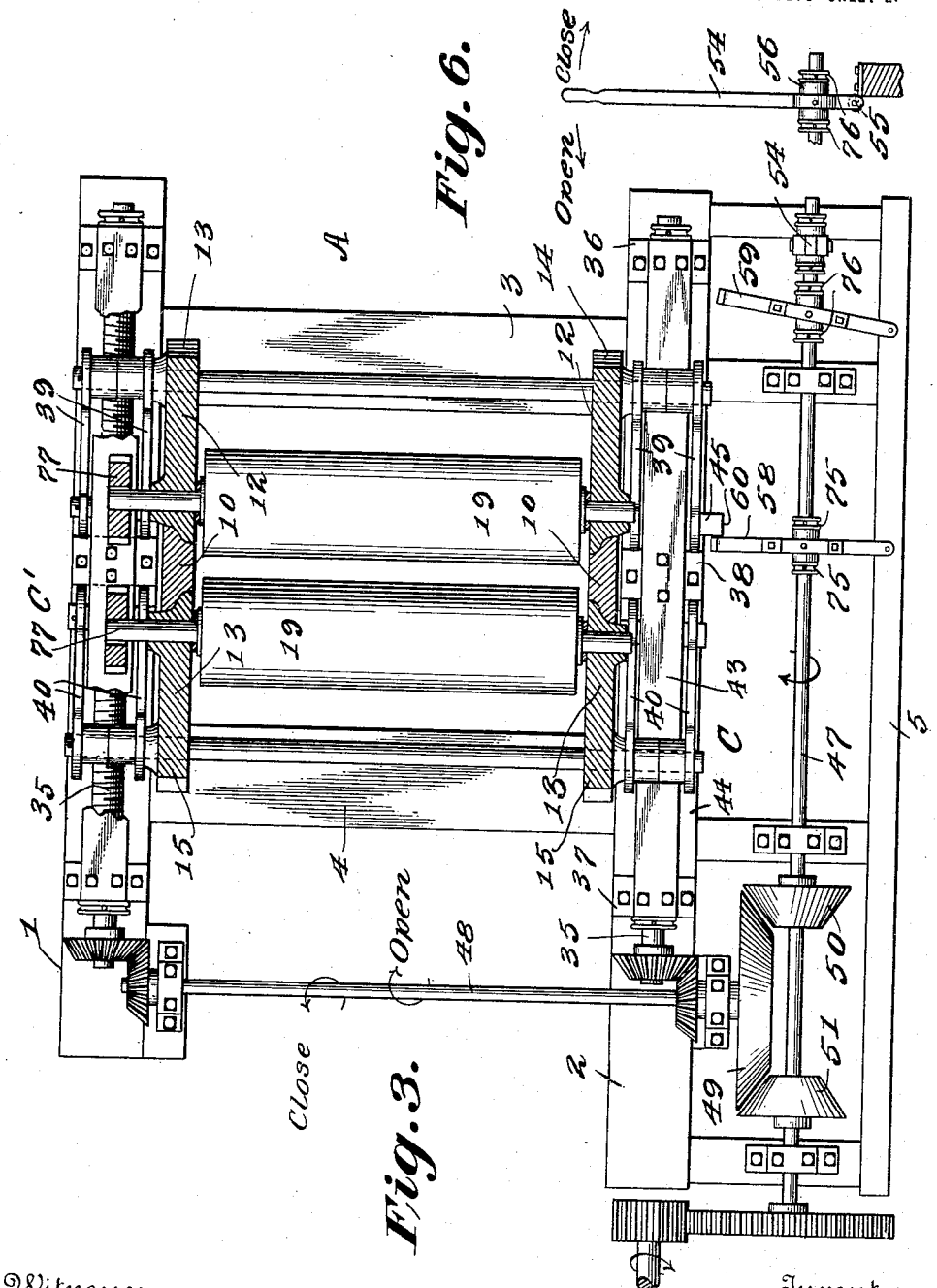

G. R. BROWN.
BALING PRESS.
APPLICATION FILED FEB. 12, 1914.
1,215,613.
Patented Feb. 13, 1917.
3 SHEETS—SHEET 3.
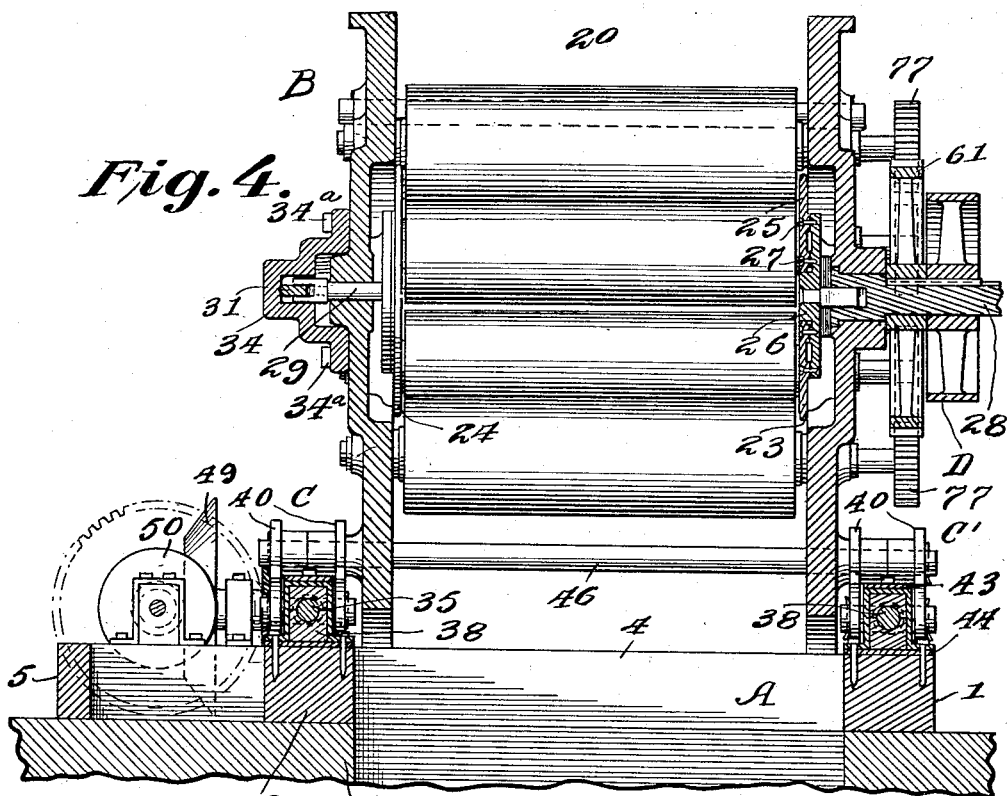
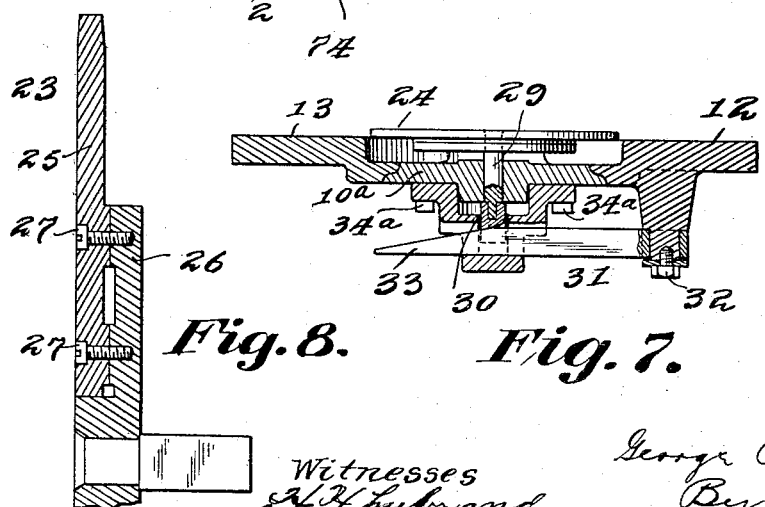

UNITED STATES PATENT OFFICE.

GEORGE RAYMOND BROWN, OF OKLAHOMA, OKLAHOMA, ASSIGNOR OF ONE-THIRD TO BENJAMIN CLAYTON AND ONE-THIRD TO WILLIAM L. CLAYTON, BOTH OF OKLAHOMA, OKLAHOMA.

BALING-PRESS.

1,215,613.        Specification of Letters Patent.     Patented Feb. 13, 1917.

Application filed February 12, 1914. Serial No. 818,288.

*To all whom it may concern:*

Be it known that I, GEORGE R. BROWN, a citizen of the United States, residing at Oklahoma, in the county of Oklahoma and State of Oklahoma, have invented certain new and useful Improvements in Baling-Presses, of which the following is a specification, reference being had therein to the accompanying drawing.

This invention relates to improvements in baling presses, more particularly to presses of the class of those in which each has a series of rolls arranged approximately radially around a central chamber wherein a round bale is formed.

Among the several objects aimed at are to provide such construction and arrangement of parts that the discharging of the newly formed bales can be readily and quickly accomplished; to provide means for opening and closing the baling chamber which will effectually take the reaction from the increasing pressure, which will lock the opening and closing devices in desired positions, which will bring power to bear immediately in opening and closing; which will permit the bale to move directly downward from the baling chamber; and also provide means which will indicate at all times the degree of pressure that is being exerted. These and other matters of advantages that are aimed at will be readily understood from the drawings and the description below.

In the drawings,

Fig. 3 is a horizontal section on the line 3—3 of Fig. 1, and showing also the driving mechanism;

Fig. 4 is a vertical section taken on the line 4—4 of Fig. 1;

Figs. 5, 6, 7 and 8 show details.

Figure 1:
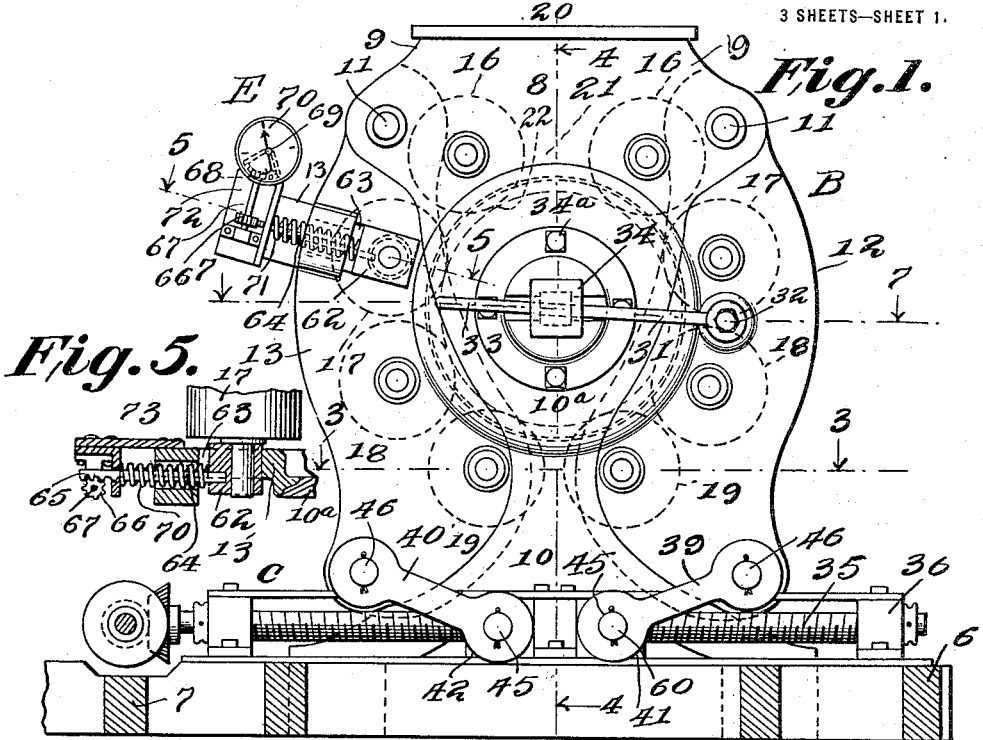
Figure 1 is a side elevation of the principal parts of a mechanism embodying my invention, shown in their closed or normal working positions.

In the drawings, I have shown one form of mechanism embodying my improvements, and will describe the same somewhat in detail, but wish it to be understood that in numerous respects there can be modifications without departing from the essential features of the invention.

A indicates the base structure; B indicates the baling press, proper, that is, the series of rolls, and their supporting frame and carriers; C indicates one part of the roll-opening-and-closing mechanism, and C' the other part or section; D, the roll-driving mechanism; and E indicates the devices for registering, or visually showing, the pressure which is being exerted at any time while the rolls are in operation.

The base structure A is shown as comprising the main longitudinal sills 1, 2, and the cross girts 3, 4. There is a supplemental, or extension, frame, having a longitudinal sill 5 and a suitable number of cross girts as at 6, 7, this supporting some of the power devices to be described.

Upon this base or foundation frame are supported, and to it are rigidly secured, the stationary parts of the press. These are strong metal uprights or frame plates, indicated as entireties by 8, 8; and each having the upper wider part 9, the base part 10, and an intermediate downward-tapering part 10ª. The base parts 10 are rigidly bolted to the foundation structure. These end parts 8, 8, can be braced and bound together by cross rods or bars, if found necessary.

At each end of the press there are two swinging or movable roll-carriers 12, 13. They are suspended from shafts or cross rods 11, 11, passing across the press from one end plate 8 to the other. These swinging roll carriers can be of any suitable conformation. As shown, they have outwardly turned projections or extensions as at 14, 15, for a purpose to be described.

In the upper wide part 9 of the stationary end uprights are mounted two of the bale-forming rolls 16, 16. In each of the movable roll carriers 12, 13, there are mounted three rolls 17, 18, 19. When the parts are in normal working position, as in Fig. 1, the rolls of the entire series are symmetrically arranged, their axes lying approximately in a cylindrical surface. They are of substantially equal diameter and they inclose a substantially cylindrical chamber 22 for receiving the cotton and forming the bale.

The two upper rollers 16, 16, are spaced apart sufficiently to provide a throatway or passage 21 between them so that the cotton entering at 20 at the top of the press can readily pass down to the baling chamber.

At the ends of the bale chamber there are head plates 23, 24. Each is shown as comprising an inner section 25 and an outer section 26, which are secured together by smooth headed screws 27.

The head 23 is secured to and carried by the shaft 28 of the central driving gear, to be later referred to.

Figure 2:
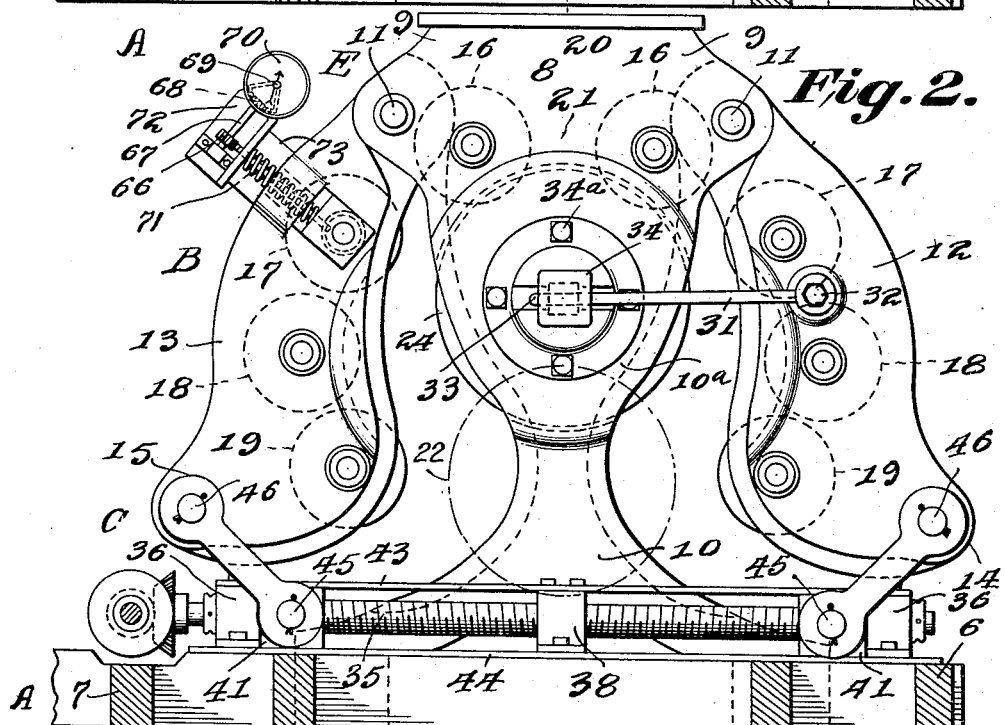
Fig. 2 is a view of the parts shown in Fig. 1, but in their open or bale-releasing position.

The head 24, though held positively to its position when at work, is permitted to yield outward when the press is to be opened for removing the bale. It is secured to a short shaft 29 mounted in a bearing in one of the end walls 8. This shaft 29 has a block or attachment 30 with which engages a wedge rod 31. The latter is pivoted at 32 to the swinging roll carrier 12. It is formed of a wider part 33 and a tapering part 33 at the end. When the roll carrier 12 is in its innermost position, the wider part of the wedge rod 31 engages with the block or attachment 30 on the shaft 29 and forces the head 24 inward and holds it in its innermost position. But when the roll carrier 12 is swung outward to the position shown in Fig. 2, it draws the narrow part of the wedge rod 33 to points opposite the shaft 29 and the latter can slide outward and the head 24 can move out with it.

34 indicates the guide or abutment for the wedge rod. It is shown as a casting fastened at 34ª to the outer face of the upright or end wall. It has a lateral passageway wherein the wedge rod is situated and provides a holder or abutment for the rod to take the pressure which it meets with when moving the plate 24 in or holding it to its work.

The mechanism at C, C', for effecting the movements of the roll carriers, and for locking them rigidly in their positions, comprises the following parts: At each end of the machine there is a shaft 35 having a right hand thread extending from the central part toward one end and a left hand thread extending toward the other. Each is mounted in bearings 36, 37, at the ends and a bearing 38 at the center.

39, 40, indicate pitman links for transmitting power to the swinging roll carriers 12, 13. 41, 42, are nuts respectively fitted to the right hand thread and the left hand thread of the shaft 35. These nuts have pintles 45 by which they are pivoted to the pitman links 39, 40, the latter in turn pivotally connected to the roll-carriers 12, 13, by shafts 46 extending across the machine from one carrier 12 to the other, and projecting therethrough and joined to the links.

The shafts 35 are simultaneously and similarly rotated, as follows:

On the frame extension 5, 6, 7, there is mounted a prime power shaft 47 arranged to rotate and slide in suitable bearings and from it power is taken to a cross shaft 48. As shown, there is interposed between the two shafts a reversible friction drive mechanism comprising the friction bevel wheel 49 and the alternately acting friction pinions 50, 51. The latter are secured to shaft 47 which can be moved longitudinally to disengage either from engagement with the driven wheel 49, or to bring either into engagement therewith. The longitudinal movement of the shaft 47 is attainable manually by a hand lever 54, or automatically, by shifting levers 58, 59. The hand lever 54 is mounted on the frame at 55 but has loose engagement with the shaft by means of pins and a collar 56.

The automatically acting levers 58 and 59 are each suitably pivoted to the frame and loosely engage with the shaft 47 by pins and collars. As shown, they are adapted to be impinged on by one of the link pintles 45 which is extended somewhat, as shown at 60. The levers 58 and 59 have their ends respectively arranged near the extremities of the path of this pintle. When the roll carrier 12 moves outward, the lever 59 is swung outward, and this disengages the friction pinion 50 from the wheel 49 whereupon the press opening devices remain stationary. When the power devices are at work closing the movable parts of the press, they trip, at the predetermined instant, the lever 58, which moves the shaft 47 far enough to disengage the pinion 51.

In either case, the operator by the lever 54, brings into engagement the proper friction pinion.

When it is desired to permit a bale to escape from the roll chamber, the operator, by lever 54, throws the pinion 50 into engagement with the wheel 49; this rotates the shafts 35 clockwise, and the nuts 41, 42, are caused to move outward. The links carry outward the roll carriers 12, 13, until the bale chamber is opened and the parts reach, approximately, the positions indicated in Fig. 2. Just then the trip extension 60 strikes lever 59 and disengages the wheels 49 and 50, whereupon the opening mechanism stops. After the bale has been delivered, the operator, by lever 54, continues the longitudinal motion of the shaft 47 far enough to bring the wheel 51 into engagement with wheel 49, and thereupon the threaded shafts 35 are reversed and the nuts are carried toward their central positions, and just as they reach their predetermined points of rest, the trip projection 60 strikes the other lever 58 and disengages wheel 51.

As the two systems (the threaded shafts, nuts, links, etc.), one at each end of the machne, are alike, the above description of one is sufficient.

The mechanism, indicated as an entirety by D, namely, the driving gear and the driven pinions on the roll shafts, being substantially similar to that heretofore proposed for earlier machines, for example, in the patent to A. L. Treese, No. 980,706, dated January 3, 1911, it is not necessary to describe the same in detail. There is in the present case a central spur toothed driving wheel 61 on the shaft 28 and on the end of each roll shaft there is a pinion 77 meshing with this central wheel. The driving wheel is actuated in any preferred way.

One of the rollers in the carrier plates 13 is mounted in movable bearing boxes 62. These are slidably mounted in slots 63, formed in the swinging carriers 13, the edges of the latter forming guides to govern the movements of the boxes. The possible outward movement of the roller and its box is utilized to ascertain or indicate the amount of pressure that is being exerted by the bale as it forms. 64 is a rod connected to one of the sliding boxes 62 and movable longitudinally therewith. At the outer end of this rod there is a rack 65 which engages with a wheel 66. This wheel is on a shaft 67 and the latter carries at its upper end a pinion meshing with a rotatable segment 68. The latter is mounted at 69. It carries an index needle, arrow, or the like, 70.

71 is a spring, preferably arranged to surround the rod 64, and bearing inward against the movable box 62 and outward against an abutment at 72. When the pressure rises beyond a certain limit it overcomes the resistance of the spring 71, and thrusts the box and the rod 64 outward more or less. The rod, in turn, rotates the shaft 67, the segment 68 and the indicator 70. With the latter there can be combined any graduated device that is preferred for reading the variations of pressure. The part 72 is secured by standards 73 to the roll carrier, and, if desired, the index can be mounted in a glass-covered chamber and the parts at 64, 65, 66, 67 can be covered by a casing or housing.

When the press is opened with the devices above described, the bale escapes from the inner chamber by gravity. It descends to an opening or passageway in the base or foundation 74, and quickly passes therethrough to any desired receiver.

There are several matters incident to the present construction which insure a speed in the delivery of the bales much greater than that attainable with any machine of this class before proposed, these including the matter just described, to wit, the direct downward escape of the bale by gravity, and also the fact that the press is opened by moving two sets of rollers away from the baling chamber, this of itself requiring but one-half the time necessary with mechanisms in which there is but one swinging or movable roll-carrying section.

The two outward and inward moving parts of the press are substantially counterparts of each other, each carrying the same number of rolls; but this is not essential to the attainment of the purposes of the invention as the number of rolls on the sections can be modified. Some of the advantages of my invention can be attained if only one of the series of rolls and their carrier be made outwardly movable. Again, it is not essential that the separation of one roll system from the other should be related to a truly vertical plane through the axis of the bale chamber. The rolls provide a lateral, approximately continuous, peripheral closure for the bale chamber, and the basic requirement is that this closure be adapted to be opened at a place on the periphery far enough to provide a passage somewhat wider than the diameter of the bale. Even if the parts are so arranged that the bale escapes on an inclined line or a horizontal line, the opening of the bale chamber by moving two oppositely disposed roll carriers greatly expedites this part of the operation. I prefer, however, to have not only two oppositely moving bale carriers, but also to have the directly downward escape of the bale under the action of gravity.

As concerns the means which I have designed for opening and closing the press, I have found them to be greatly superior to any heretofore used or proposed. There are present not only means which positively effect the closing, but also means which operate as a powerful lock or holder for the roll carriers, and the devices which constitute this locking or holding system are constantly in working engagement with each other. These are to be strongly contrasted with the hooks, hasps, latches, or the like, which have been heretofore suggested. The pressure is very great which is exerted by the gradual winding up of a cotton bat into a cylindrical shape in a roll-surrounded chamber such as herein shown. If the material is to be compressed to a density of thirty pounds, the total pressure which is exerted in the mechanism will be equal to fifteen tons. If a lock or holder having separable parts is employed, they must be so arranged that when the rolls are at work there will be a positive lock, and in such case the force required to open the lock elements will be from eight tons upward. With the devices which I have provided, any pressure ordinarily met with in this work can be very readily handled, and at the same time the parts will permit immediate movement of the roll carriers at the proper instant. The screws and nuts can, with economy and simplicity of design, be made as powerful as is necessary, and yet be positive in their action. The pitches of the threads are related to the pressure to be experienced, and the reaction upon the nuts does not cause any backward rotation of the screw shafts, so that in effect they are a positive lock; and at the same time, the shafts are ready to push the nuts, in the desired direction, without releasing or opening any inter-engaging elements.

With the parts in place, it is impossible to swing the roll carriers or move the opening devices too far, in either direction, as the automatic disengaging devices stop the carriers at precisely the predetermined points. By the adjusting devices at 75, 76, the press opening means can be so relatively placed as to stop the movements at any predetermined points.

The revolving head plates 23 and 24 being each made in two sections, as above described, these parts of the structure can be readily taken out whenever necessary. The inner disk parts extend radially beyond the inner parts of the rolls; but they can be readily removed after the screws at 27 are withdrawn, as they, the disks, can then be carried inward toward the center of the bale chamber and separately detached. After that, their supporting shafts and their carrying hubs 26 can be readily dismounted by moving them inward also. This obviates the necessity of dismounting all or any of the pressure rolls in order to adjust, or withdraw and replace, the head plates.

The nuts 41 and 42 are held against rotation by the bars 43 and 44, which engage with their top and bottom sides and furnish an accurate guide as well as holder for them.

Each nut and its threaded rod are two constantly engaging motion-imparting devices, which I refer to as "non-overhauling." The driving element can be disconnected from the power and there will be no reverse motion of these parts, although they are constantly ready for imparting a motion in one direction or the other to the ultimately driven parts. They not only constitute a power transmitter but furnish also a holder for the movable rolls which is in effect a substantially positive lock, obviating the necessity of any supplemental parts for holding all of the rolls stationary in position around the baling chamber during the time the bale is being formed.

What I claim is:

1. In a bailing press, the combination of a series of compression rolls arranged on horizontal axes around the bale-forming chamber, means for moving horizontally and bodily away from their working positions all of the rolls below the horizontal plane of the axis of the baling chamber and for holding them stationarily during the time the bale is forming, and a frame for supporting the said rolls and roll-moving mechanism, it being formed with an escape passage extending vertically downward through it for the direct downward escape of the bales.

2. In a baling press, the combination of a series of compression rolls arranged on horizontal axes around a bale-forming chamber, means for moving horizontally and bodily away from their working positions the rolls below that part of the bale which is the widest horizontally and for holding them stationarily during the time the bale is forming, and a frame for supporting the said rolls and roll-moving mechanism formed with an escape passage extending vertically downward through it for the direct downward escape of the bales.

3. In a baling press, the combination of a series of compression rolls arranged on horizontal axes around a bale-forming chamber, means for opening a passage from the said chamber through which the bale can pass directly downward on vertical lines therefrom, and a frame for supporting the said rolls and roll-moving mechanism provided with an escape passage extending vertically downward through it for the direct downward escape of the bales.

4. In a baling mechanism, the combination of a frame, a series of compression rolls on horizontal axes arranged around a baling chamber, means holding said rolls stationary during the time of bale forming, and means for moving one or more rolls in one direction from the vertical plane of the axis of the baling chamber, means for moving one or more rolls in the opposite direction from the said plane and for returning the first said rolls and the second said rolls in the opposite directions to their working positions.

5. In a baling mechanism, the combination of the frame, a series of rolls on horizontal axes around the baling chamber, the roll-supporting devices having two oppositely moving roll-carriers, and means for moving the said roll-carriers from the working positions and returning them oppositely thereto and adapted to hold them stationary during the time the bale is forming.

6. In a baling mechanism having a baling chamber, a series of compression rolls around the said chamber, a stationary central roll-carrying frame element, and two oppositely movable roll-carrying frame elements adapted to open the baling chamber to permit the escape of the bale directly downward and to hold the rolls carried thereby stationary during the time the bale is forming.

7. In a baling press having a baling chamber, the combination of a series of compression rolls around the said chamber, a framework having a stationary element opposite the axis of the said baling chamber, two oppositely moving roll-carrying frame elements arranged to open the chamber surrounded by the rolls and permit the escape of the bale and means for holding the roll carrying elements stationary during the time the bale is forming.

8. In a baling press having a baling chamber, the combination of a series of compression rolls arranged around a baling chamber, a roll support having a stationary central element, two swinging roll-carrying frame elements pivotally connected to the stationary element and adapted to have the rolls carried thereby respectively move oppositely from and toward the baling chamber and means for holding the rolls stationary during the time the bale is forming.

9. In a baling press having a bale-forming chamber, the combination of a series of compression rolls, a frame having a stationary element, two swinging roll-carrying elements pivotally suspended from the stationary element at their upper ends and adapted to have their lower ends recede from and approach the baling chamber and means for holding the roll carrying elements stationary during the time the bale is forming.

10. In a baling press having a bale-forming chamber, the combination of a series of rolls surrounding the said chamber, a roll support composed of a stationary central element opposite the ends of the baling chamber, two swinging roll-supporting elements suspended from the stationary element and arranged to move oppositely and simultaneously toward and from the baling chamber and means for holding the roll supporting elements stationary during the time the bale is forming.

11. In a baling press having a bale-forming chamber, the combination of a series of rolls surrounding the said chamber, a swinging carrier supporting some of the said rolls and movable in one direction, a swinging carrier for others of the said rolls movable in the opposite direction from and toward the baling chamber and means holding said carriers stationary during the time the bale is forming.

12. In a baling press having a bale-forming chamber, the combination of a series of rolls surrounding the said chamber and arranged to remain stationary during the time the bale is forming, a stationary supporting frame, and two oppositely movable roll-carriers, one or more of the said rolls being mounted in each carrier.

13. In a baling mechanism having a series of rolls arranged around a bale-forming chamber and stationary during the time the bale is forming, two oppositely acting roll-carriers movable toward and from the baling chamber, a driving mechanism moving continuously in one direction, and two oppositely acting power transmitting devices interposed between the said driver and the said roll-carriers respectively.

14. In a baling mechanism, a series of rolls arranged around a bale-forming chamber, two oppositely acting roll-carriers movable toward and from the bale-forming chamber, a train of power transmitting devices connected to both of the said carriers, power mechanism for optionally actuating the said train, and an automatically acting substantially positive holder for each of the said carriers to hold the rolls thereon rigidly in operative position.

15. In a baling press having a series of rolls around a bale-forming chamber, a roll-carrier having two elements one of which is movable toward and from the bale-forming chamber, a power mechanism, power transmitting devices between the power mechanism and the movable roll-carrier, a manually operable clutch for disconnecting the power mechanism, the transmitting devices including two constantly engaging power transmitting devices connected to the roll-carrier and adapted to provide a substantially positive lock therefor when the rolls carried thereby are in working position.

16. In a baling mechanism having a bale-forming chamber, the combination of a series of rolls arranged around the said chamber, a stationary frame, a movable carrier whereon are mounted some of the said rolls, a carrier operating shaft arranged to take the thrust from the movable carrier endwise of the said shaft, and a power transmitting connector between the said shaft and the movable carrier.

17. In a baling mechanism having a bale-forming chamber, the combination of two roll-carriers movable toward and from the bale-forming chamber, two threaded shaft sections, two oppositely moving nuts engaging therewith, two sets of connecting devices between the said nuts and the said roll-carriers, respectively, and means for optionally imparting power to the shaft sections.

18. In a baling machine having a series of rolls arranged around a bale-forming chamber, two oppositely acting roll-carriers movable toward and from the said chamber, a rotary shaft provided with two oppositely moving nuts engaging with the said shaft, and means permanently connecting the said nuts, respectively, with the roll-carriers.

19. In a baling mechanism having a series of rolls around a bale-forming chamber, an axially movable rotary head support, a rotary head secured thereto by devices permitting the head to be detached therefrom and moved inward relatively to the rotary head support and to the baling chamber.

20. In a baling machine having a bale-